US010974410B2

(12) United States Patent
Higgins

(10) Patent No.: US 10,974,410 B2
(45) Date of Patent: Apr. 13, 2021

(54) STRIPPER CLIP

(71) Applicant: Speedpin Limited, Dublin (IE)

(72) Inventor: Michael Higgins, Dublin (IE)

(73) Assignee: Speedpin Limited, Dublin (IE)

( * ) Notice: Subject to any disclaimer, the term of this patent is extended or adjusted under 35 U.S.C. 154(b) by 192 days.

(21) Appl. No.: 16/090,454

(22) PCT Filed: Apr. 11, 2017

(86) PCT No.: PCT/EP2017/058712
§ 371 (c)(1),
(2) Date: Oct. 1, 2018

(87) PCT Pub. No.: WO2017/190925
PCT Pub. Date: Nov. 9, 2017

(65) Prior Publication Data

US 2019/0111580 A1 Apr. 18, 2019

(30) Foreign Application Priority Data

May 5, 2016 (GB) ..................................... 1607848

(51) Int. Cl.
*B62D 7/18* (2006.01)
*B26D 7/18* (2006.01)
*B26F 1/44* (2006.01)

(52) U.S. Cl.
CPC ........ *B26D 7/18* (2013.01); *B26D 2007/1809* (2013.01); *B26F 2001/4445* (2013.01)

(58) Field of Classification Search
CPC .............. B26D 2007/1809; B26D 7/18; B26D 2007/1872; B26F 2001/4445; B65H 2404/563

(Continued)

(56) References Cited

U.S. PATENT DOCUMENTS 3,710,039 A * 1/1973 McFadden ............. G11B 23/04 360/132
4,685,363 A * 8/1987 Gerber ................... B26D 7/015 269/21

(Continued)

FOREIGN PATENT DOCUMENTS

DE 202014101283 U1 4/2014
JP H054197 A 1/1993

(Continued)

OTHER PUBLICATIONS

Dictionary entry for "Ball", retrieved on Jun. 5, 2020 from URL https://www.merriam-webster.com/dictionary/ball (Year: 2020).*

(Continued)

*Primary Examiner* — Valentin Neacsu
(74) *Attorney, Agent, or Firm* — Withrow & Terranova, P.L.L.C.

(57) ABSTRACT

A stripper clip (100) for a die board (300) of a stripping machine, the stripper clip (100) comprising: a hub (110) to be fitted into a corresponding socket (320) of the die board (300); a bridge extending from the hub (110) to a distal end (122); and a cantilevered arm (130) extending from the distal end (122) of the bridge. The clip (100) is dimensioned to fit into a socket (320) of the die board (300) with the cantilevered arm (130) extending from an underside of the die board (300) into an aperture (310) of the die board (300) for receiving waste pieces from blanks. The clip (100) is formed of a resilient material so that the cantilevered arm (130) is deflected towards the hub (110) as a waste piece (410) passes through the die board (300) and so that the arm (130) reflexes as the waste piece (410) passes the cantilevered arm (130) to assist in disposing of the waste piece (410).

6 Claims, 5 Drawing Sheets

(58) Field of Classification Search
USPC ...... 493/373, 342, 82, 472, 83; 83/118, 128, 83/142, 143, 145–146
See application file for complete search history.

(56) References Cited

U.S. PATENT DOCUMENTS

| | | | | | |
|---|---|---|---|---|---|
| 4,911,038 | A * | 3/1990 | Ferrin | B67B 7/44 225/93 |
| 5,040,780 | A * | 8/1991 | Lohrmann | B65H 3/54 271/124 |
| 5,181,640 | A * | 1/1993 | Vossen | B26D 7/1818 225/93 |
| 5,361,453 | A * | 11/1994 | Gerber | A46D 9/04 15/142 |
| 6,235,369 | B1 * | 5/2001 | Shepard | A44B 18/0003 428/85 |
| 6,644,153 | B1 | 11/2003 | Gordon | |
| 6,688,085 | B2 * | 2/2004 | Yu Chen | B65B 13/025 100/29 |
| 6,997,363 | B1 * | 2/2006 | Vossen | B26D 7/1818 225/103 |
| 7,360,475 | B2 * | 4/2008 | Quercia | B26D 7/1818 225/93 |
| 9,370,870 | B2 * | 6/2016 | Jakob | B26D 7/1818 |
| 2005/0227846 | A1 * | 10/2005 | Quercia | B26D 7/1818 493/373 |
| 2005/0227847 | A1 * | 10/2005 | Quercia | B31B 50/00 493/373 |
| 2008/0066595 | A1 * | 3/2008 | Coursey | B26F 1/00 83/14 |
| 2008/0307937 | A1 * | 12/2008 | Simmons | B65B 9/2028 83/36 |
| 2009/0272499 | A1 * | 11/2009 | Quercia | B26D 7/1818 156/765 |
| 2010/0263506 | A1 * | 10/2010 | Holliday | B26F 1/44 83/23 |
| 2012/0001137 | A1 * | 1/2012 | Holliday | B26D 7/015 254/133 R |
| 2013/0068077 | A1 | 3/2013 | Coursey | |
| 2013/0112053 | A1 | 5/2013 | Jakob | |
| 2015/0266692 | A1 * | 9/2015 | Tiedemann | B65H 37/005 156/577 |
| 2016/0067876 | A1 | 3/2016 | Jakob | |
| 2016/0355366 | A1 * | 12/2016 | Tiedemann | B65H 35/002 |
| 2018/0194586 | A1 * | 7/2018 | Tiedemann | B65H 35/0026 |

FOREIGN PATENT DOCUMENTS

| | | | |
|---|---|---|---|
| JP | H0596498 | A | 4/1993 |
| JP | 2012183641 | A | 9/2012 |

OTHER PUBLICATIONS

Combined Search and Examination Report for United Kingdom Patent Application No. GB1607848.7, dated Jun. 5, 2017, 8 pages.
International Search Report and Written Opinion for International Patent Application No. PCT/EP2017/058712, dated Jul. 27, 2017, 12 pages.
International Preliminary Report on Patentability for International Patent Application No. PCT/EP2017/058712, dated Nov. 15, 2018, 7 pages.
First Office Action and Search Report for Chinese Patent Application No. 201780022572.1, dated Jun. 3, 2019, 9 pages.

* cited by examiner

Figure 1
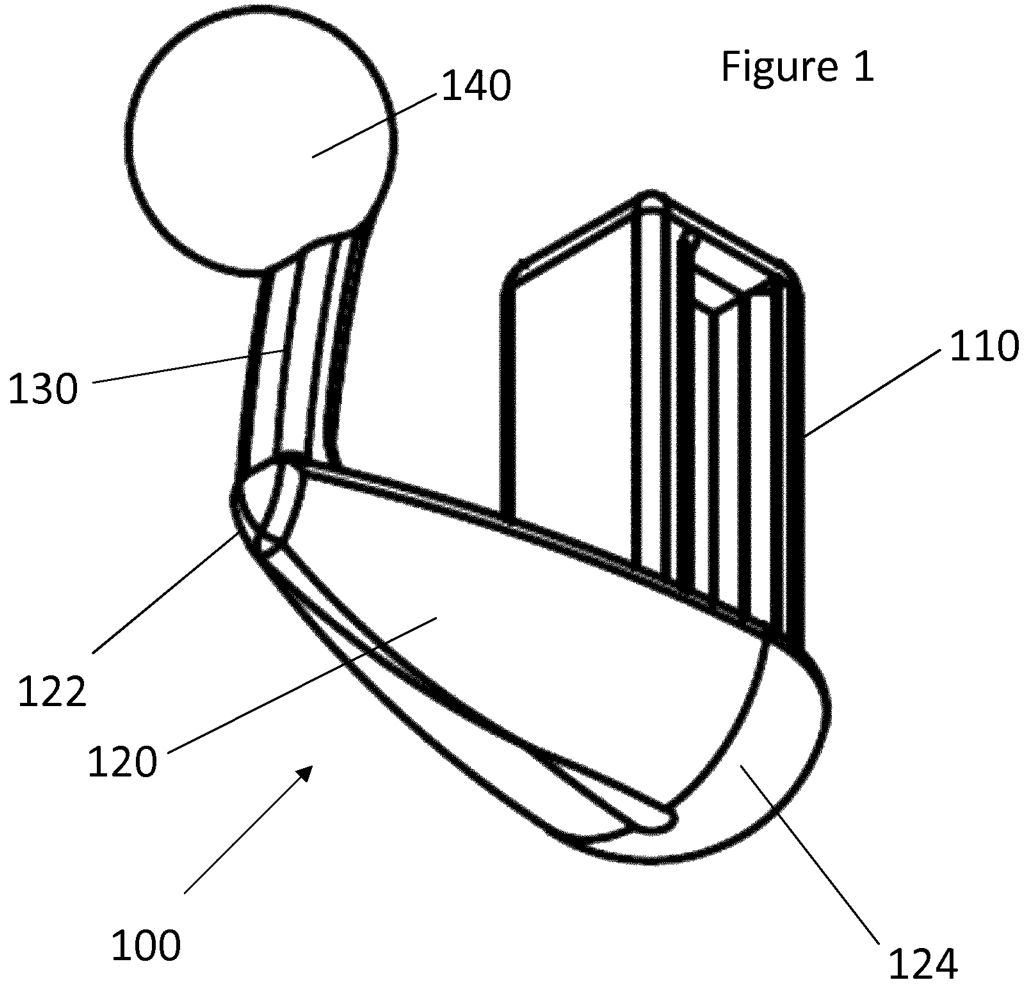
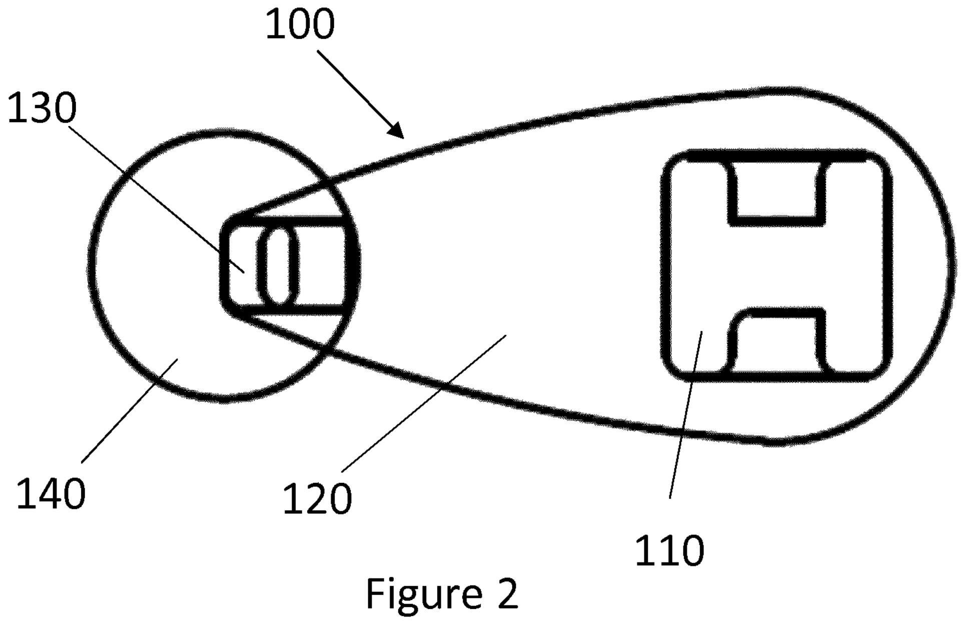
Figure 2

STRIPPER CLIP

This application is a 35 USC 371 National Phase filing of International Application No. PCT/EP2017/058712, filed Apr. 11, 2017, the disclosure of which is incorporated herein by reference in its entirety.

FIELD OF THE INVENTION

The present invention relates a stripper clip for use in stripping machines for producing card, paper or plastics blanks or the like.

BACKGROUND TO THE INVENTION

A variety of products are produced from card, paper or plastics blanks that are typically made from plain sheets which are cut and creased before being folded into shape.

Typically, an outline for a product blank can be defined using, for example, a computer controlled laser or equivalent cutting device which can define outlines in either a single sheet or a stack of sheets. The outline can be defined as a line of weakening in which a number of frangible links (nicks) maintain the blank in position within the original sheet. When required, the blank can then be punched or stripped from the original sheet (or vice versa) leaving a peripheral piece of waste.

It can also be desirable for a blank to include internal apertures requiring waste pieces to be removed from within the blank. Again, respective outlines for these apertures can be defined using a laser or equivalent cutting device which can define outlines in either a single sheet or a stack of sheets—this can be done at the same time as defining the external outline of the product. Removal of waste product from within a blank is usually performed by feeding the blank through a stripping machine and punching the waste piece(s) through a die from where they are collected.

One type of stripping machine, available for example, from Bobst of Switzerland, can be loaded with: a moveable punching board comprising punching members, such as pins or blades; a fixed die board, having a major surface juxtaposed a major surface of the punching board; and, where the punching board comprises pins, a moveable bottom stripper frame disposed adjacent a surface of the die board opposite the punching member.

Each of these 2 or 3 boards is especially designed for the blank which is to be processed by the stripping machine with pins/blades located and apertures defined in accordance with the shape, size and location of waste pieces to be removed from the blank.

The die board is provided with machined apertures corresponding to the shape of the waste pieces to be removed from the blank. During operation, the punching board reciprocates between a refracted state, where its punching members are spaced apart from the die board and enable one or more blanks to be located between the punching board and the die board with waste pieces lying in register with corresponding apertures, and an extended state, where the punching members have passed through corresponding apertures within the die board having broken the respective waste pieces from the blank and driven them though the aperture where they can be collected along with any other waste pieces from the blank and other blanks.

Blanks can be fed through a stripping machine either individually, in stacks or they can form part of a continuous web which is cut into individual blanks after being processed by the stripping machine.

Where the punching board punching members comprise pins and no bottom stripper frame is employed, a common problem is that waste pieces may not be cleanly or fully removed from a blank. Such waste pieces are either carried away with the blank and so may require that a product be rejected or need to be reworked—or worse, a waste piece may become stuck within a die board aperture, so preventing subsequent blanks from being properly positioned within the stripping machine and so causing the stripping machine to break down.

In order to facilitate cleaner and more precise removal of waste pieces from a product blank, the bottom stripper frame includes a plurality of stripping pins which correspond with and lie in register with respective punching pins of the punch. The bottom stripper frame also moves from a retracted state, where it is withdrawn below the die board, to an extended state where each punch pin and a corresponding bottom stripper pin catch a respective waste piece while fixed within the blank. The bottom stripper frame then retracts in tandem with the advancing punching board until the punching board reaches its fully extended state. The punching board then begins to move back towards its retracted state and so opens a gap between the punching pins and the corresponding bottom stripper pins. This allows waste pieces which have been stripped from a blank by the combined punching pin and stripper pin to fall away where they can be recovered. The punching board then fully retracts to its retracted state to allow the blank(s) now stripped of its waste piece(s) to be fed from the stripping machine and for a new blank or stack of blanks to be fed into the stripping machine.

While bottom stripper pins are effective—assembling, mounting and dismantling of the bottom stripping frame is expensive and time consuming.

SUMMARY

According to the present invention, there is provided a stripper clip for a stripping machine according to claim 1.

Embodiments of the present invention enable a 2-board stripping machine comprising a bespoke punching board and die board to operate with a similar level of reliability to a 3-board stripping machine including a bottom stripper frame. The boards can be accommodated in conventional stripping machines and are fitted in the exact same way. Indeed, no changes are required to the control of the stripping machine to accommodate die boards including stripper clips according to the invention.

Embodiments only require the definition of suitable cavities or sockets in the die board to accommodate the stripper clips, but this is readily achieved when designing the die board and does not unduly increase machining time. Indeed the stripper pins are extremely cheap to produce and certainly much cheaper than the pins required for a bottom stripper frame and may either be disposed (if they are worn) or re-used from die board to die board.

BRIEF DESCRIPTION OF THE DRAWINGS

An embodiment of the invention will now be described, by way of example, with reference to the accompanying drawings, in which:

FIG. 1 is a perspective view of a stripper clip according to an embodiment of the present invention;

FIG. 2 shows cross-sectional detail of the stripper clip of FIG. 1;

DESCRIPTION OF THE EMBODIMENTS

Figure 3:
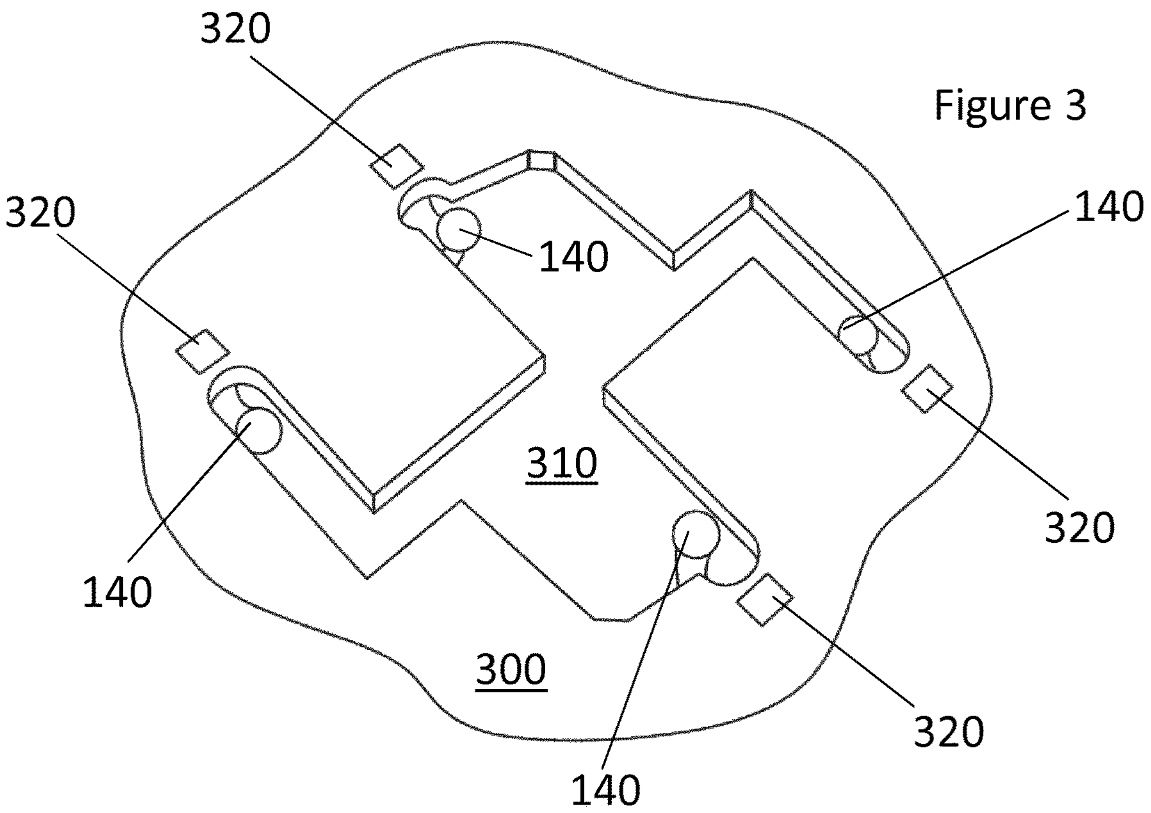
FIG. 3 shows a portion of an upper surface of a die board including a number of stripper clips.

Referring now to FIG. 1 there is shown a stripper clip 100 according to an embodiment of the present invention. The clip 100 is integrally formed as a unitary piece of a stiff resilient material, preferably a plastics material. The clip 100 can be injection molded, machined or prototyped using a 3D printer. The stripper clip 100 may also be formed of metal or any other resilient material or a combination thereof such that stripper clip 100 is able to repeatedly recoil or spring back into shape after bending.

The stripper clip 100 has a hub 110 which is shaped to be inserted into a corresponding cavity or socket in a die board as explained in more detail below. In the embodiment, the hub 110 has a generally square outline, allowing it to be located in a socket with a pre-defined angular orientation—however, it will be appreciated that the hub can have a variety of shapes compatible with being inserted in a socket in a die board. Referring to FIG. 2, in the embodiment the hub 110 has an I-section with a narrowed internal waist facilitating insertion of the hub in a socket and also reducing the material required for the clip without compromising its strength in its principal direction of flexure explained below. A bridge portion 120 extends away from the hub 110 from a proximal end 124 to a distal end 122. In the embodiment, the outside surface of the hub 110 is curved to facilitate being pushed into place by hand, whereas the internal surface of the bridge portion 120 is flat to facilitate engagement with the underside of the die board as will be explained below.

An arm 130 extends from the internal surface of the distal end 122 and is terminated with a ball 140, giving the clip a U-shape. The cross-section of the arm 130 as well as the material forming the clip 100 allow the arm to flex backwards and forwards towards and away from the hub 110.

Figure 4:
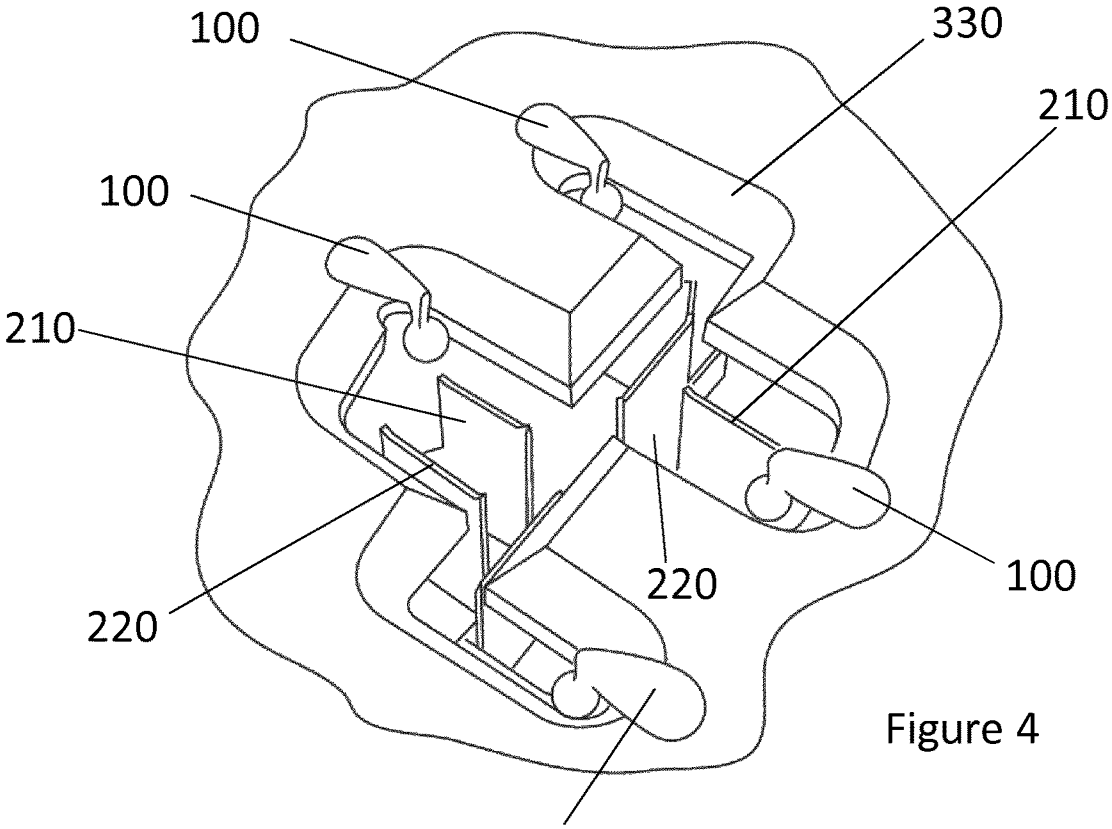
FIG. 4 shows a portion of a lower surface of the die board of FIG. 3.

Referring now to FIG. 3, there is shown an upper portion of a die board 300 incorporating a number of stripper clips 100 according to an embodiment of the invention. The die board 300 is generally constructed in the same manner as the die board used in a stripping machine such as provided by Bobst and a number of apertures 310 (only one shown) corresponding in shape to waste pieces to be removed from a blank are defined in the die board 300. In the case of the aperture 310 of FIG. 3, four sockets 320 are formed adjacent the aperture 310. In the embodiment, the sockets 320 are shown as fully penetrating the die board 300, however in alternative embodiments, the sockets can be formed as blind holes from the underside of the die board 300. A hub 110 for each stripper pin 100 is push fitted into each socket 320 so that its arm 130 extends from the underside of the die board 300 upwards into the aperture 310, as can be seen in FIG. 4. Note from FIG. 4 that in the embodiment, the sidewall 330 of each aperture 310 is undercut from the underside of the die board so that it presents a larger underside area than upper surface area and so the bridge portion 120 needs to extend far enough away from the hub 110 to compensate for this undercut.

Referring now to FIGS. 5(a) to (d) which show a die board 300 including a stripper clip 100 in various operating states.

Figure 5:
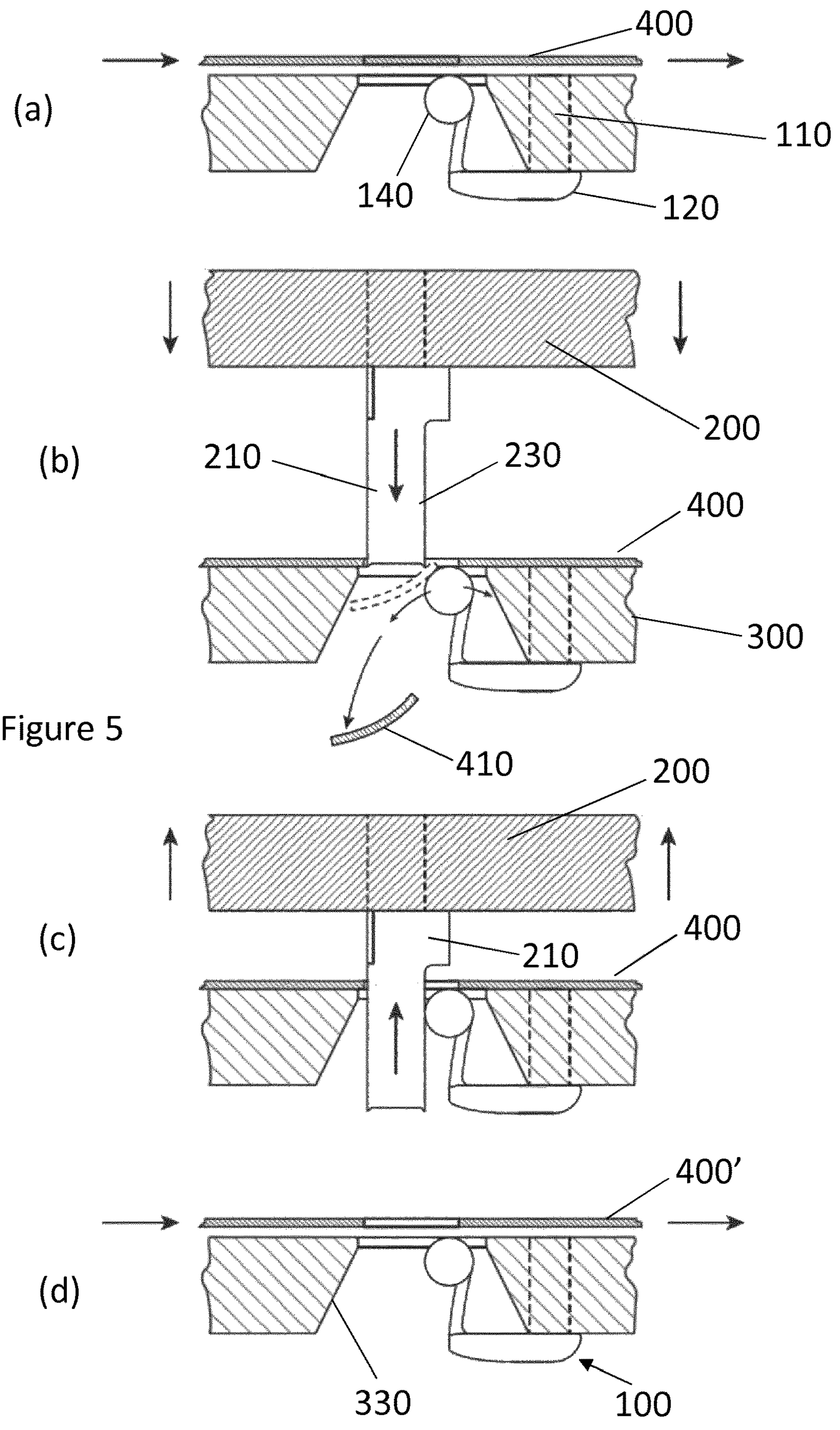
FIGS. 5(a) to (d) show a portion of a stripping machine including the stripper clip of FIG. 1 in a number of operating states.

In FIG. 5(a), a punching board 200 is in a retracted state and a blank 400 is fed into the stripping machine. The punching board 200 now moves downward from its refracted state, until punching members 210 extending from the punching board engage a top surface of the blank, FIG. 5(b). In the embodiment, the punching members comprise blades 210, 220 which lie in register with apertures in the die board. As indicated in FIG. 4, some blades 220 are not operatively associated with stripper clips, whereas each stripper clip 100 is associated with a respective blade 210. In the embodiment, each blade 210 and its associated stripper clip 100 are co-planar. An edge 230 of the blade proximate the associated clip 100 lies in register with the furthest extent of the ball 140 into the aperture.

As the punching board 200 moves further downward from the position shown in FIG. 5(b), each blade 210, 220 begins to shear a waste piece away 410 from the blank 400. Blanks can vary in thickness and in the present embodiment, may be up to 0.8 mm thick. As a waste piece 410 is pushed through the aperture 310 by a punching member 210 (and possibly other punching members 220,210), the arm 130 of the stripper clip 100 tends to flex backwards towards the sidewall 330 of the aperture 310 according to the thickness of the waste piece. Eventually as the punching board 200 moves downwards and the blade 210 drags the waste piece past the stripper ball 140, the arm 130 and ball 140 snaps back into its original position, so tending to flick the waste piece away as shown in FIG. 5(b).

The punching board 200 continues to move downwards towards its fully extended state shown in FIG. 5(c) and then begins to retract. It will be appreciated that even if a waste piece were somehow stuck to be blade 210 at this stage, it would be extremely difficult to pass back past the ball 140 of the stripper clip 100 and so become stuck in the aperture.

Once the punching board 200 has returned to its retracted state, a new blank 400' can be fed into the stripping machine to be processed as before, FIG. 5(d).

Figure 6:
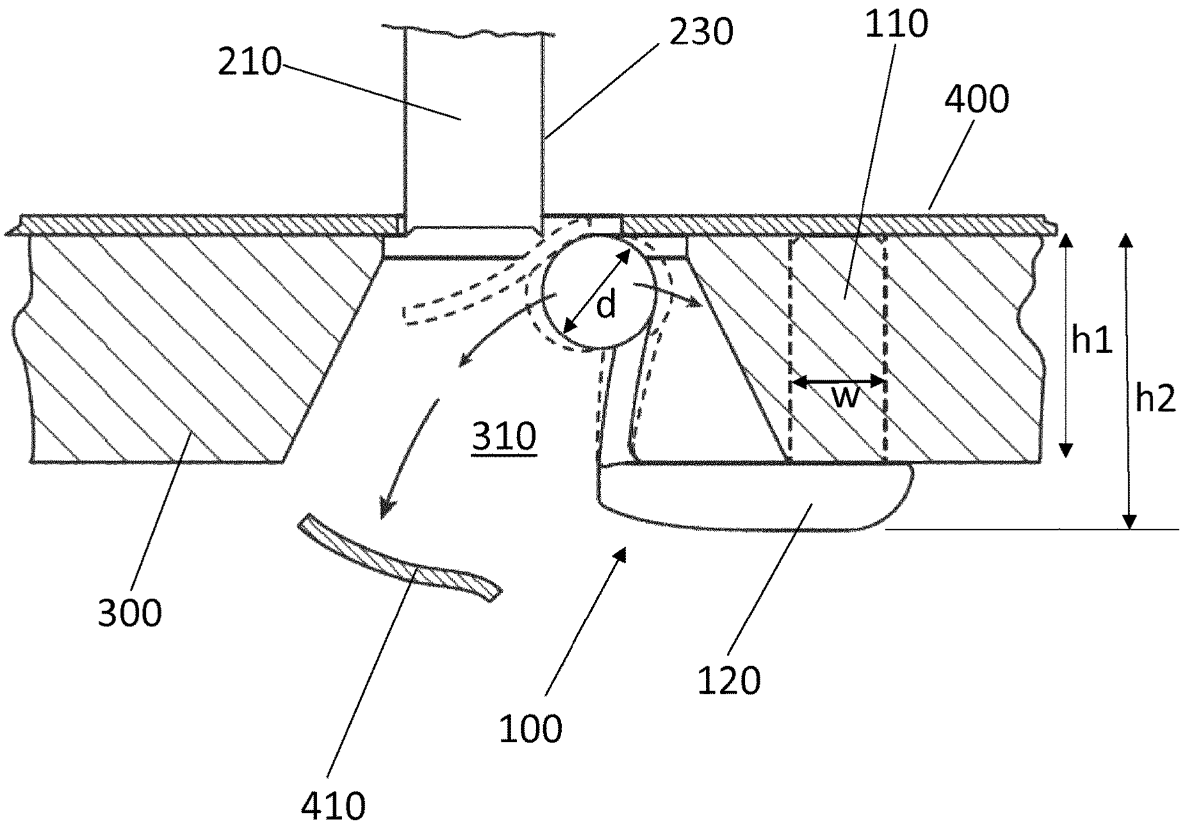
FIG. 6 is a cross-sectional view showing in detail the stripping action of the stripper clip of FIG. 1.

FIG. 6 shows the dimensions of the stripper clip 100 and die board 300 in more detail. A typical die board is 12 mm deep and so the height h1 of the hub 110 cannot exceed this. In the embodiment, the total height h2 of the stripper pin is 15.5 mm and the diameter d of the ball 140 is 6 mm. The remainder of the dimensions are in proportion.

Figure 7A:
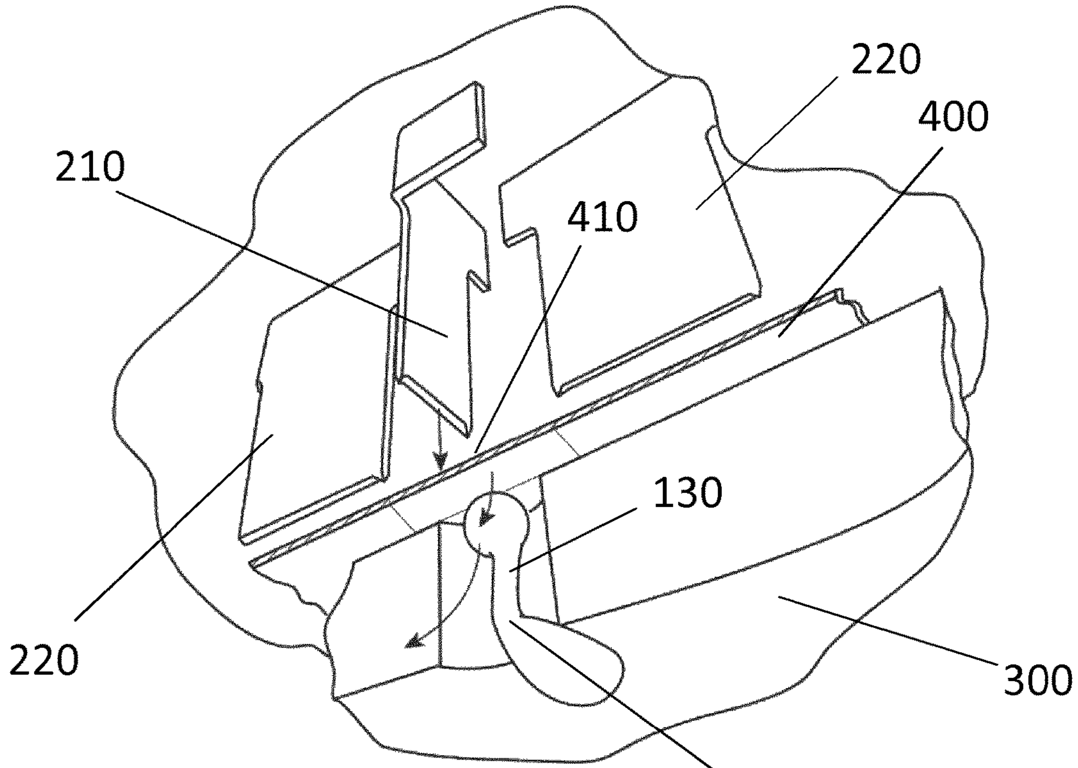
FIGS. 7(a) and (b) are perspective views showing in detail the stripping action of the stripper clip of FIG. 1.
Figure 7B:
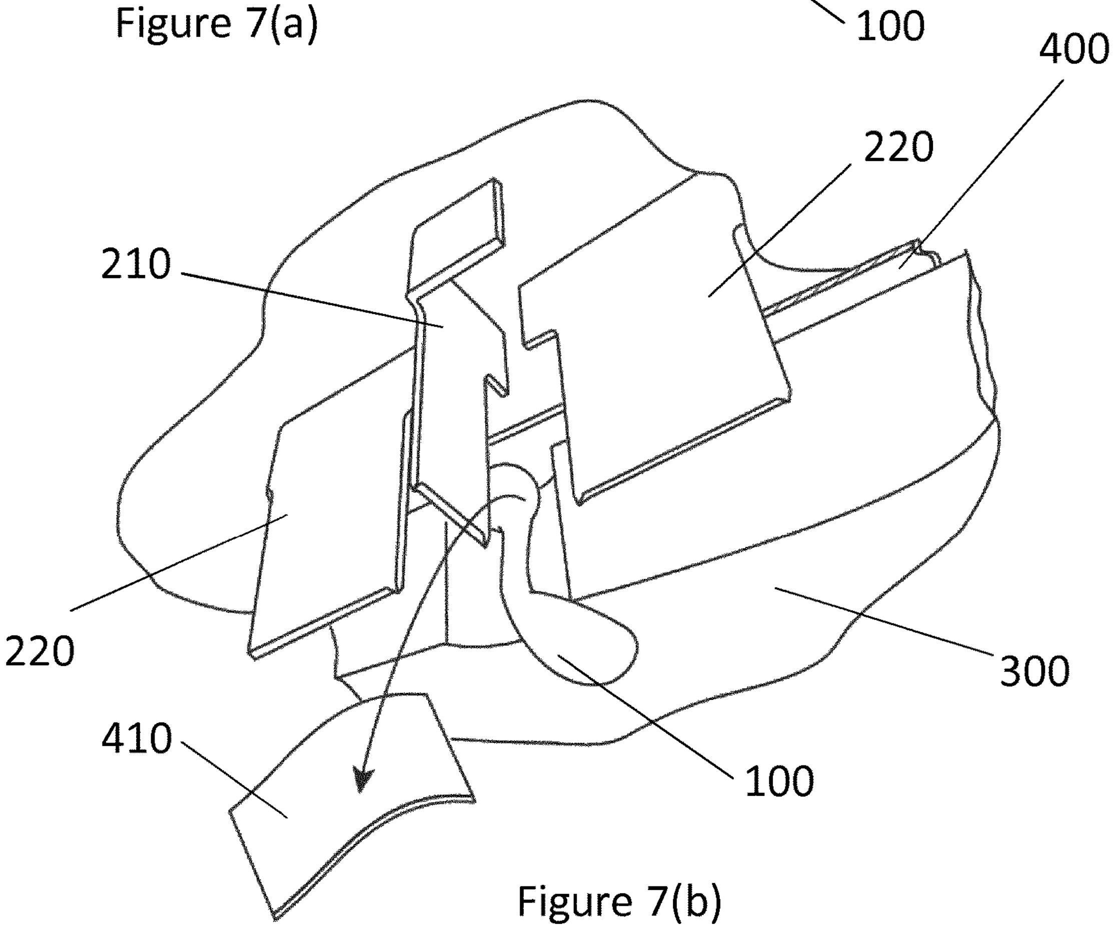

FIGS. 7(a) and 7(b) show the movements of punching blades 210, 220 relative to a blank 400 (shown cutaway) in more detail. Note that the blade 210 and stripper pin 100 are in register and co-planar and the snapping action of the arm 130 which tends to flick away a waste piece 410 as well as prevent the piece from being drawn back through the aperture.

The invention claimed is:

1. A stripper clip for a die board of a stripping machine, the stripper clip comprising:
   - a hub to be fitted into a corresponding socket of the die board;
   - a bridge extending from said hub to a distal end; and
   - a cantilevered arm extending from said distal end of said bridge, wherein said cantilevered arm comprises a ball at its free end;
   - said clip being dimensioned to fit into a socket of the die board with said cantilevered arm extending from an underside of said die board into an aperture of the die board for receiving waste pieces from blanks, and the clip being integrally formed as a unitary piece of a resilient material so that said cantilevered arm is deflected towards said hub as a waste piece passes through said die board and so that said cantilevered arm reflexes as said waste piece passes said cantilevered arm to assist in disposing of said waste piece.

2. A stripper clip as claimed in claim 1 wherein said hub has a non-circular section to ensure an angular orientation when inserted in a socket of the die board.

3. A stripper clip as claimed in claim 1 formed from a plastics material.

4. A stripper system comprising:

a die board, in which a plurality of apertures are formed and adjacent at least some of which one or more sockets extend from an underside of said die board; and at least one stripper clip located in a respective socket, each stripper clip comprising:

a hub fitted into a corresponding socket of the die board;

a bridge extending from said hub to a distal end; and a cantilevered arm extending from said distal end of said bridge, wherein said cantilevered arm comprises a ball at its free end;

said clip being dimensioned to fit into a socket of the die board with said cantilevered arm extending from said underside of said die board into an aperture of the die board for receiving waste pieces from blanks, and the clip being integrally formed as a unitary piece of a resilient material so that said cantilevered arm is deflected towards said hub as a waste piece passes through said die board and so that said cantilevered arm reflexes as said waste piece passes said cantilevered arm to assist in disposing of said waste piece.

5. The stripper system of claim 4 further comprising a punch board including a plurality of blades arranged to lie in register with the plurality of apertures of said die board, each stripper clip extending along and lying coplanar with a blade of said punch board.

6. The stripper system of claim 5 wherein each stripper clip is arranged to extend so that said free end of said cantilevered arm lies in register with an edge of a blade of said punch board.

* * * * *